E. J. WIGGINS.
METHOD OF PREPARING LIQUID HYDROCARBON FOR COMBUSTION.
APPLICATION FILED APR. 19, 1911.
Reissued July 4, 1911. 13,266.
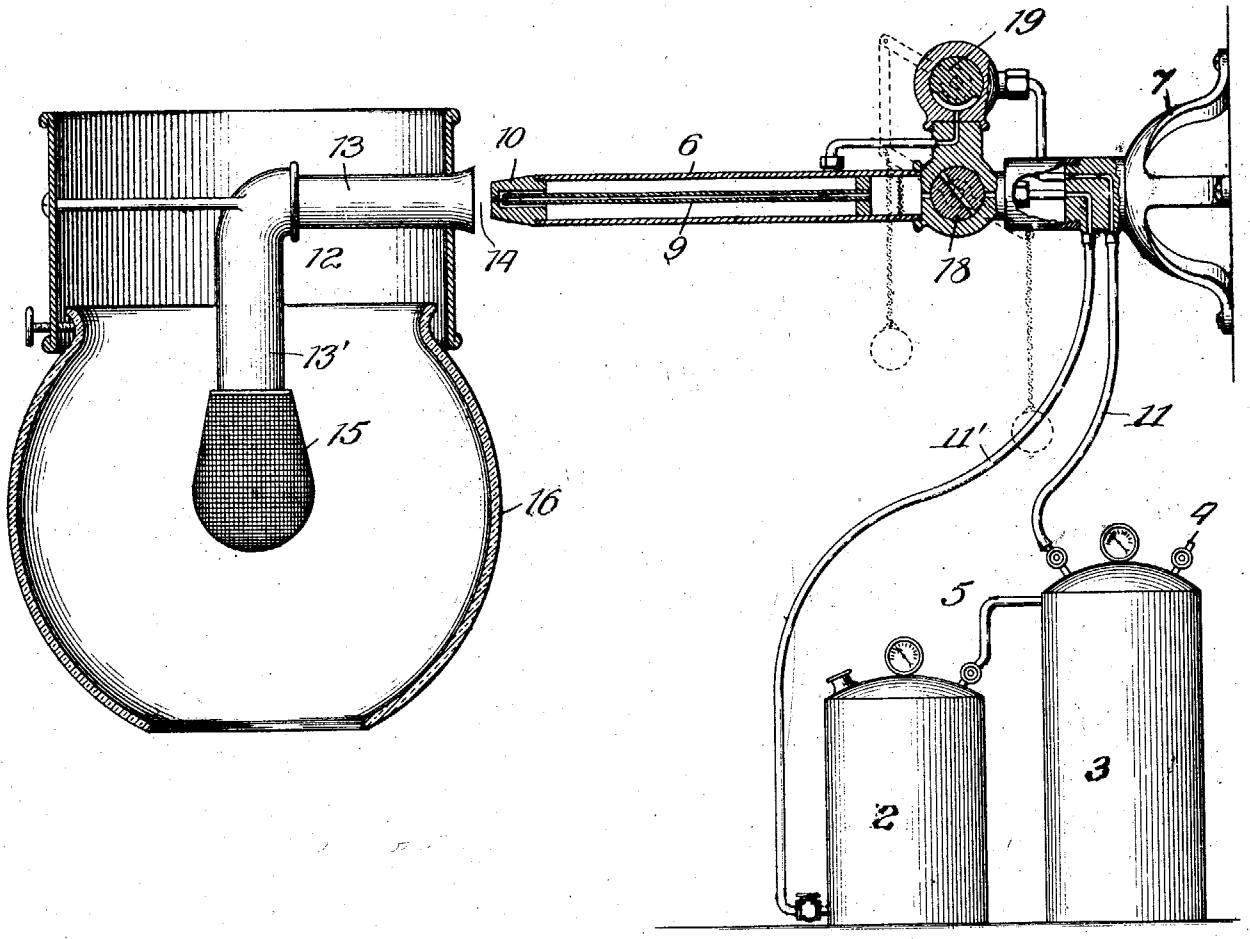
Witnesses:
Geo. E. Gaylord
G. F. Chase
Inventor:
Edward J. Wiggins,
By Dyrenforth, Lee, Christy & Wiles,
Attys.

UNITED STATES PATENT OFFICE.

EDWARD J. WIGGINS, OF CHICAGO, ILLINOIS, ASSIGNOR, BY MESNE ASSIGNMENTS, TO KEROGAS COMPANY, OF CHICAGO, ILLINOIS, A CORPORATION OF SOUTH DAKOTA.

METHOD OF PREPARING LIQUID HYDROCARBON FOR COMBUSTION.

13,266. Specification of Reissued Letters Patent. Reissued July 4, 1911.

Original No. 964,893, dated July 19, 1910, Serial No. 539,548. Application for reissue filed April 19, 1911. Serial No. 622,145.

*To all whom it may concern:*

Be it known that I, EDWARD J. WIGGINS, a citizen of the United States, residing at Chicago, in the county of Cook and State of Illinois, have invented a new and useful Improvement in Methods of Preparing Liquid Hydrocarbon for Combustion, of which the following is a specification.

The object of my invention is to provide a novel and comparatively inexpensive method of preparing liquid hydrocarbon for combustion, and more particularly kerosene and the heavier hydrocarbons (though it is also applicable to the lighter hydrocarbons, or mixtures, such as gasolene), whereby in feeding the same to a burner, as the point of combustion, it shall be rendered, while traversing its course thereto, readily ignitible at the burner and so thoroughly combustible as to emit a blue flame of high incandescing ability.

My invention may be best explained by reference to means suitable for practicing the method, such means being illustrated in the accompanying drawing, which shows, by a broken and sectional view in side elevation, partly diagrammatic, a desirable form of apparatus for the purpose.

The supply of liquid hydrocarbon, such as kerosene, may be contained in a tank 2 and is preferably maintained under pressure, and it is also preferred, but not necessary for the practice of my invention, to employ air under pressure for use in the manner hereinafter described, for which purpose an air-pressure supply tank is shown at 3 provided with a nipple 4 at which to connect an air-pump (not shown) which may also supply the pressure to the tank 2, which communicates with the tank 3 through a valved hose-connection 5. An air-pipe 6 leads horizontally from a wall-bracket 7, and terminates at its advance-end in a perforated plug forming the spraying-nozzle; and it has a valved hose-connection 11 near its opposite end with the air-pressure tank 3. A tube 9 of small bore extends centrally through the air-pipe, terminating in the spraying-nozzle 10 and communicating at its inlet-end, through a valved hose $11^1$, with the tank 2. The burner 12 is of the Bunsen type. Its horizontal tubular section 13 is in alinement with the nozzle 10, but is separated therefrom by an air-space 14 of considerable width and forms the mixing chamber for the mixture emitted from the nozzle and introduced into the chamber with more air by its discharge through the atmosphere in the space 14. The depending tubular section $13^1$ of the burner is the burner proper and its discharge-end or mouth is covered by a mantle 15 of any suitable kind in the incandescing type enveloped in a globe 16 supported by a metal ring 17.

Upon opening connected valves 18 and 19 controlling the liquid and air passages, kerosene courses through the tube 9 at great velocity and is discharged in a fine spray from the nozzle 10 where it is met by the air discharging under pressure from the pipe 6, with the effect of atomizing the oil and mixing therewith. This mixture of liquid hydrocarbon and air discharges into the atmosphere in the short space 14 which it traverses in entering the chamber 13, and it carries with it into the latter enough more air from the atmosphere to render the resultant product completely combustible or approximately so. By coursing the mixture through the chamber 13 the particles of kerosene become more and more broken up and the intimacy of their commingling with air is so enhanced as to reduce the product discharging from the mixing chamber into the burner-section $13^1$ to a readily ignitible condition, the flame, upon ignition, being blue and instantaneously incandescing the mantle. More or less of the heat of combustion is radiated from the point of combustion and from the mantle into the chamber 13 and serves to "crack" the particles of hydrocarbon, meaning to break up the hydrocarbon molecules; and as the burner becomes heated, its wall conducts the heat to the section 13 to exert its distilling influence on the mixture in the chamber and supplement the cracking and distilling action thereon of the radiant heat from the flame.

An important feature of my improvement, which constitutes a principal element of its departure in the art, is that of spraying the hydrocarbon in an unheated condition in its course to the burner, into the atmosphere to atomize it while cold and mix air therewith, thus avoiding any heating of the liquid hydrocarbon before it has been atomized and more or less intimately mixed with air;

whereas, in the prior art, the liquid hydrocarbon is subjected to the influence of heat in its course to or at the spraying-nozzle or point of spray-discharge, and the heat cracks the hydrocarbon and tends to produce the deposit of carbon from its constituents, causing the latter to clog the passages and obstruct the flow. By keeping heat away from the kerosene until its atomization and intimate mixture with air have been effected, the cracking action is avoided until its possible carbonizing referred to, or coking, will cause no harm, and, moreover, the solid particles of carbon then remain in the resultant product and are consumed in the flame.

As will be understood by those skilled in the art to which my invention relates, the product of mixing, cold, atomized liquid hydrocarbon with air acquires great kinetic energy, due to heat-producing action, and the oxidizable particles are split up into smaller and more volatile bodies, resulting in a homogeneous mixture of gas, vapor, hydrocarbon particles and air, of lesser density, but of greater volume than the primary mixture.

The temperature in the chamber 13 must be sufficiently high to "crack" the hydrocarbon in the mixture, and the unheated or cold condition of the liquid hydrocarbon and air, and the mixtures thereof, in their course to the chamber 13, means that they may not be subjected to a temperature that will "crack" the hydrocarbon, since otherwise the object of my method would be frustrated, while the liquid hydrocarbon is not injuriously affected for my purpose by a lower temperature. Moreover, it is essential that the mixture that is sprayed into the chamber 13 shall not be subjected to material condensation, since if it becomes so condensed in its course, it is impaired for the "cracking" action of the heat and my improved method will fail of its purpose, so that the spraying into that chamber must be immediate, or so nearly so as to avoid the objectionable condensation of the mixture.

What I claim as new and desire to secure by Letters Patent, is:

1. The method of preparing liquid hydrocarbon for combustion, which consists in conducting separately liquid hydrocarbon and air, both in unheated condition, to a point of mixing the two while in such condition, spraying the unheated mixture in its course to the point of consumption into the atmosphere, thereby atomizing it while in such unheated condition and mixing more air with the resultant fluid, and thereupon immediately subjecting the mixture to a "cracking" temperature in said course.

2. The method of preparing liquid hydrocarbon for combustion, which consists in conducting separately liquid hydrocarbon and air, both in unheated condition, to a point of mixing the two while in such condition, spraying the unheated mixture in its course to the point of consumption into the atmosphere, thereby atomizing it while in such unheated condition and mixing more air with the resultant fluid, and thereupon immediately subjecting the mixture, in said course, to the heat generated at the point of consumption and thus "cracking" the hydrocarbon.

EDWARD J. WIGGINS.

In presence of—
NORMAN A. STREET,
CHAS. I. HARDY.